Sept. 5, 1939.  L. F. BAIRD  2,172,327

MILK STRAINER COVER

Filed Dec. 10, 1936

Lewis F. Baird INVENTOR.

BY N. S. Amstutz

ATTORNEY.

Patented Sept. 5, 1939

2,172,327

UNITED STATES PATENT OFFICE 2,172,327

MILK STRAINER COVER

Lewis F. Baird, Boone Grove, Ind., assignor of two-thirds to Erven D. Baird, Boone Grove, Ind., and Raymond W. Hockelberg, Valparaiso, Ind.

Application December 10, 1936, Serial No. 115,187

2 Claims. (Cl. 220—32)

My invention relates to improvements in milk strainer covers and it more especially consists of the features pointed out in the claims.

The purpose of my invention is to secure the production of milk under the most sanitary conditions; that when ordinary milk strainers are left uncovered more or less during the milking period, the presence of flies is invited, which naturally jeopardizes the hygienic and sanitary conditions of the milk; that in the use of any ordinary cover, milk can not be put into a can, through a strainer, without entirely removing the cover; that should a removed cover be forgotten for even only a short time, flies will gather, especially during the summer season, on the inside of the strainer and be washed down onto the strainer to contaminate the milk, or other foreign matters. A further purpose is to provide automatic means that will prevent the raised hinged part from falling flatwise onto the stationary part to project a considerable distance from the side of the strainer and engage unhygienic shelves, siding boards, etc., etc.

With these and other ends in view I illustrate in the accompanying drawing such an instance of adaptation as will disclose the broad underlying features of the invention without limiting myself to the specific details shown thereon and described herein.

Figure 1:
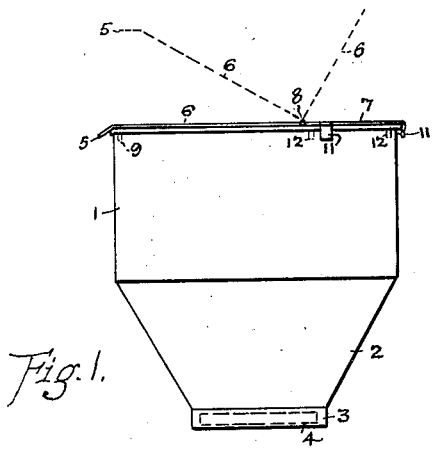
Fig. 1 is a side elevation of the hinged cover applied to the top of a milk strainer.
Figure 4:
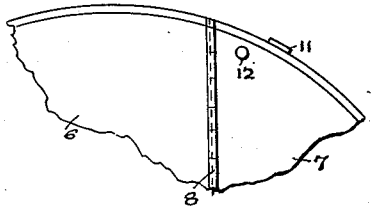
Fig. 4 is a fragmentary bottom view of a part of the cover.
Figure 2:
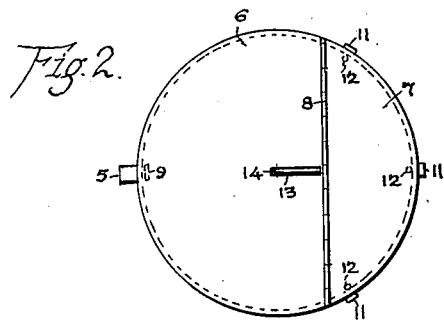
Fig. 2 is a top plan view of the cover.
Figure 3:
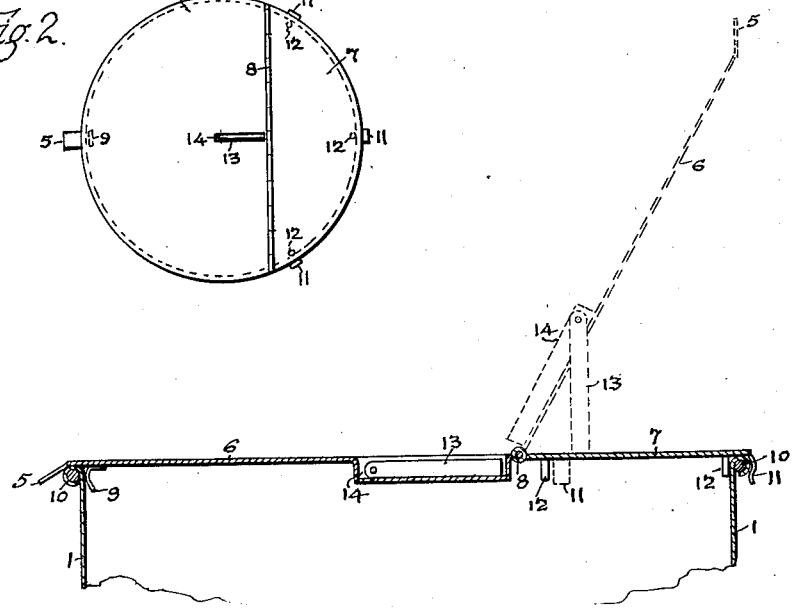
Fig. 3 is an enlarged elevation in section of a strainer and the cover.

In utilizing my invention I may use whatever expedients or alternatives of construction that the exigencies of varying conditions may demand without departing from its broad spirit.

A suitable casing 1 is provided to form the body of a milk strainer. The lower end 2 of the casing is of conical shape and it terminates in a ring 3 in which a strainer 4 may be removably held.

The lid 5 is formed in two parts, the large portion 6 being secured to the smaller portion 7 by a hinge 8. The cover portion 6, at its front edge, has a spring projection 9 which snubs past the reinforcing wire 10 on its inside so that when the cover is lowered it will remain tightly closed.

The smaller portion 7 of the cover 5 has spring clips 11 that engage the body 1 on the outside of the reinforcing wire 10. In order to hold the portion 7 in place, when the portion 6 is raised as milk is being poured into the strainer, inwardly depending pins 12 are formed adjacent the catches 11.

The pins 12 and the clips 11 hold the smaller portion 7 from sliding horizontally and the catch 9 holds the larger part 6 in engagement with the top of the strainer when it is lowered so as to effectually close it instead of having recourse to the use of newspapers, etc., as is ordinarily done.

It is a rather common experience in the use of uncovered strainers to have cats investigating the inside of the strainer. In addition to this contamination it certainly is unsanitary and unhygienic for the accumulations on the strainer element to compel the introduction of a new supply of milk onto this debris of flys etc., which have been collected on it. All of this is avoided in my cover. To insure that the part 6 of the cover will stand a little past the vertical when raised a swinging stop 13 is pivoted in a recess 14 of the part 6 adjacent the hinge 8. This will lie down flat when the part 6 is lowered or the cover is removed from the top of the strainer for washing and final storage in a small space. Just as soon as the lid 6 is raised past the vertical center of the hinge 8 the stop 13 automatically drops into engagement with the part 7 thus preventing the part 6 dropping down onto the part 7. If desired any kind of a knob or handle, not shown, may be affixed to the top of the part 6 or a forward projection from the front edge of the part 6 may serve the same purpose.

What I claim is:

1. A removable cover for milk strainers, comprising a narrow and a wide part, means for securing the narrow part to a strainer in an attachable and detachable manner, means for hinging the wide part as a lid to the narrow part, a recess in the lid, and a pivoted gravity stop positioned in the recess at a distance from the hinge whereby as the lid is raised past the vertical center of the hinge the free end of the stop drops into engagement with the narrow part of the cover to hold the lid part in an open position.

2. A removable cover for milk strainers, comprising a narrow and a wide part, means for securing the narrow part to a strainer in an attachable and detachable manner, means for hinging the wide part as a lid to the narrow part, a gravity stop positioned on the lid to which it is pivoted at a distance from the hinge whereby as the lid is raised past the vertical center of the hinge, the free end of the stop drops into engagement with the narrow part of the cover to hold the lid part in an open position.

LEWIS F. BAIRD.